UNITED STATES PATENT OFFICE.

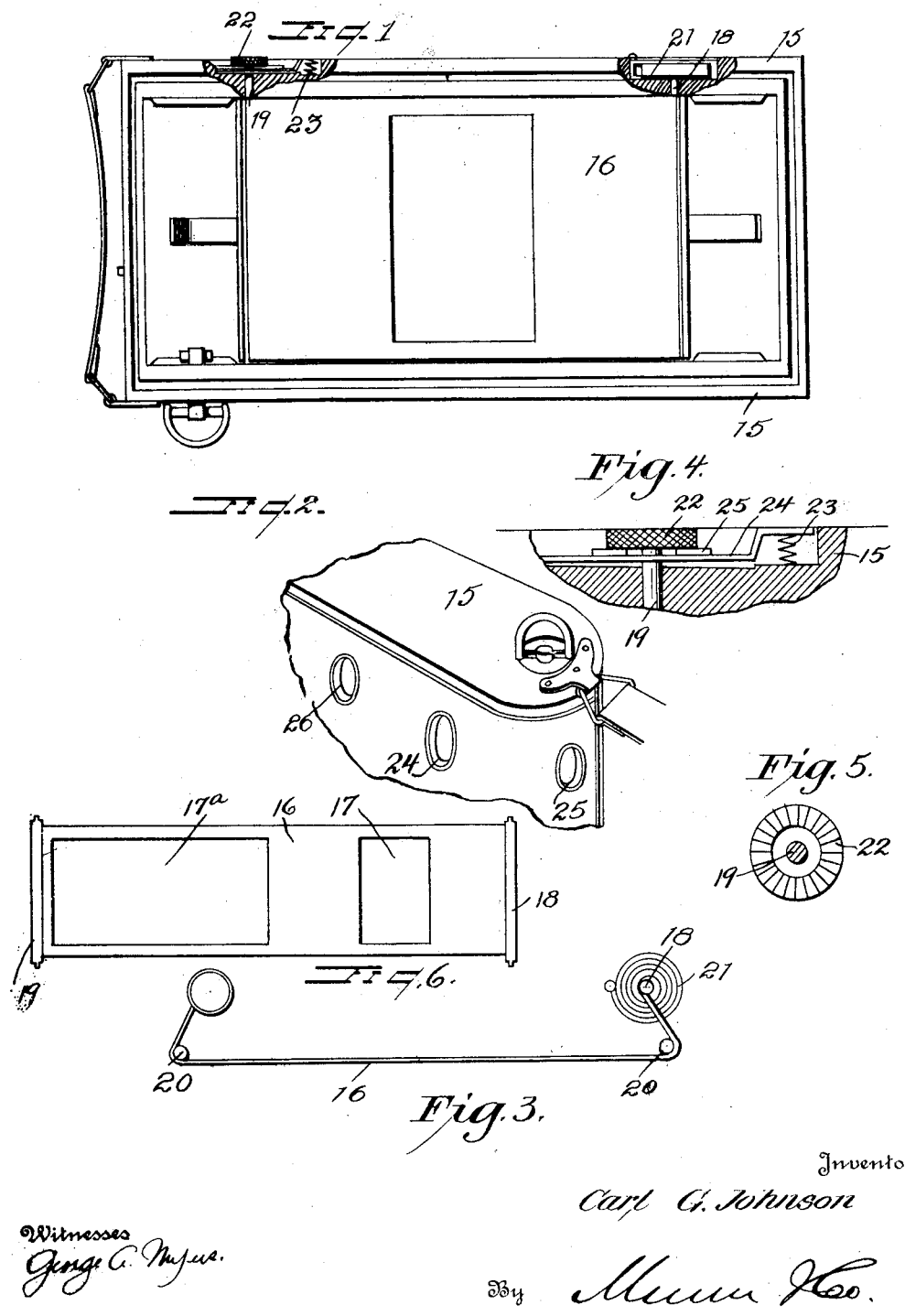

CARL G. JOHNSON, OF EAU CLAIRE, WISCONSIN.

CAMERA.

1,352,134.
Specification of Letters Patent.
Patented Sept. 7, 1920.

Application filed October 8, 1917. Serial No. 195,406.

*To all whom it may concern:*

Be it known that I, CARL G. JOHNSON, a citizen of the United States, and a resident of Eau Claire, in the county of Eau Claire and State of Wisconsin, have invented new and useful Improvements in Cameras, of which the following is a specification.

My invention is an improvement in cameras, and has for its object to provide mechanism in connection with folding cameras for permitting an exposure to be made on a lesser portion of the film than is usually exposed.

In the drawings:

Figure 1 is a rear view of a folding camera provided with the improvement with the back removed and with parts in section;

Fig. 2 is a perspective view of a portion of the camera;

Fig. 3 is a diagrammatic top plan view showing the arrangement of the curtain.

Fig. 4 is an enlarged sectional detail of a portion of Fig. 1.

Fig. 5 is a bottom plan view of the knurled head of the curtain winding roller.

Fig. 6 is a plan view of the curtain.

In Figs. 1, 2 and 3 is shown the invention applied to a folding camera indicated at 15. A curtain 16 is provided for shielding a portion of the film, the said curtain having openings 17 and 17ª of the size desired for the exposure. For instance, were it desired to expose a third of the usual exposure, an opening 17 would be provided of a size for this purpose. This curtain winds at one end upon a spring roller 18 and at the other end upon a manually operated roller 19. In order to position the curtain properly it passes over guide rollers 20 adjacent the rollers 18 and 19, and the spring 21 which controls the roller 18 is connected at one end to the roller and at the other to the camera in such manner that it tends to wind the curtain upon the roller. The roller 19 has a knurled head 22 by which it may be manipulated, and stop mechanism, indicated generally at 23, and spring controlled, is provided for preventing reverse movement of the roller under the influence of the spring. The camera, in addition to the usual opening 24 for the position indicating numerals of the film, has other openings 25 and 26 corresponding in position and use to the openings 13 and 14. With this construction, the film is turned until the position indicating numeral appears at the opening 25. With the curtain in the position of Fig. 1, that is, with the opening 17 directly in front of the lens, the exposure is made. The film is now turned until the indicating numeral appears at the opening 24, when another exposure may be made. The turning of the film until the indicating numeral reaches the opening 26 will properly place the film for the third exposure.

When it is desired to take a full size picture the catch mechanism 23 is released and the spring immediately winds the curtain upon the roller 18, withdrawing it from in front of the film, so that a full exposure may be made. The spring catch for the knurled head 22 is a plate 24 having ribs 25 on its upper surface, the said plate being secured at one end to the camera and being pressed upward at the other end toward the head by a spring 23. The head 22 has notches on its under face, which are adapted to be engaged by the head to hold the roller 19 in adjusted position. By pressing down upon the free end of the plate, that is, the end adjacent to the spring 23, the head will be released.

I claim:

In a camera, means for restricting the amount of film exposed to the light during exposure and movable to vary the position of the film exposed, the camera having auxiliary sight openings on each side of the usual opening for the position indicating numerals, and arranged in spaced relation, said restricting means comprising a curtain having an opening, a spring roller journaled in the camera and supporting the curtain at one end and upon which the curtain winds, a winding roller journaled in the camera for the other end of the curtain, said spring supported roller normally winding the curtain, and a releasable catch for the other roller.

CARL G. JOHNSON.

Witnesses:
OSCAR TANGEN,
WM. W. ELWELL.